(12) United States Patent
Woodrow, III et al.

(10) Patent No.: US 11,505,874 B2
(45) Date of Patent: Nov. 22, 2022

(54) METHODS AND APPARATUSES FOR MITIGATING TIN WHISKER GROWTH ON TIN AND TIN-PLATED SURFACES BY DOPING TIN WITH GERMANIUM

(71) Applicant: The Boeing Company, Chicago, IL (US)

(72) Inventors: Thomas A. Woodrow, III, Lakeside, TX (US); Jean A. Nielsen, Kent, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 16/824,399

(22) Filed: Mar. 19, 2020

(65) Prior Publication Data

US 2020/0216972 A1 Jul. 9, 2020

Related U.S. Application Data

(63) Continuation of application No. 13/935,768, filed on Jul. 5, 2013, now Pat. No. 10,633,754.

(51) Int. Cl.
*B32B 15/01* (2006.01)
*C25D 3/30* (2006.01)
*C25D 3/60* (2006.01)
*B32B 15/00* (2006.01)
*C25D 5/56* (2006.01)

(52) U.S. Cl.
CPC ........... *C25D 3/30* (2013.01); *B32B 15/00* (2013.01); *B32B 15/01* (2013.01); *C25D 3/60* (2013.01); *C25D 5/56* (2013.01); *B32B 2307/538* (2013.01); *B32B 2457/00* (2013.01); *Y10T 428/12715* (2015.01)

(58) Field of Classification Search
None
See application file for complete search history.

(56) References Cited

U.S. PATENT DOCUMENTS

| | | |
|---|---|---|
| 3,455,645 A | 7/1969 | Kroes |
| 4,163,700 A | 8/1979 | Igarashi et al. |
| 4,749,626 A | 6/1988 | Kadija et al. |
| 4,959,278 A | 9/1990 | Shimauchi et al. |
| 5,334,240 A | 8/1994 | Ferrier |
| 5,393,573 A | 2/1995 | MacKay |

(Continued)

FOREIGN PATENT DOCUMENTS

| | | |
|---|---|---|
| JP | 6317890 A | 1/1988 |
| JP | 200396590 A | 4/2003 |

(Continued)

OTHER PUBLICATIONS

Arnold, "Repressing the Growth of Tin Whiskers," Plating, vol. 53, No. 1, Jan. 1966, pp. 96-99.

(Continued)

*Primary Examiner* — Seth Dumbris
(74) *Attorney, Agent, or Firm* — MH2 Technology Law Group LLP

(57) ABSTRACT

The present disclosure generally relates to the field of tin electroplating. More specifically, the present disclosure relates to methods for mitigating tin whisker formation on tin-plated films and tin-plated surfaces by doping the tin with germanium.

20 Claims, 7 Drawing Sheets

(56) References Cited

U.S. PATENT DOCUMENTS

| | | | |
|---|---|---|---|
| 5,750,017 A * | 5/1998 | Zhang | C25D 3/60 |
| | | | 205/102 |
| 6,319,461 B1 * | 11/2001 | Domi | B23K 35/262 |
| | | | 420/557 |
| 6,361,823 B1 | 3/2002 | Bokisa et al. | |
| 6,860,981 B2 | 3/2005 | Schetty, III et al. | |
| 7,160,629 B2 | 1/2007 | Crosby | |
| 7,391,116 B2 | 6/2008 | Chen et al. | |
| 7,604,871 B2 | 10/2009 | Jackson et al. | |
| 7,918,984 B2 | 4/2011 | Huang et al. | |
| 8,329,248 B2 | 12/2012 | Jackson et al. | |
| 2002/0187364 A1 | 12/2002 | Heber et al. | |
| 2002/0192492 A1 | 12/2002 | Abys et al. | |
| 2003/0150743 A1 | 8/2003 | Obata et al. | |
| 2003/0201188 A1 | 10/2003 | Schetty, III et al. | |
| 2005/0211461 A1 * | 9/2005 | Horikoshi | H05K 3/244 |
| | | | 174/117 FF |
| 2005/0252783 A1 | 11/2005 | Hradil et al. | |
| 2006/0096867 A1 | 5/2006 | Bokisa et al. | |
| 2007/0007144 A1 | 1/2007 | Schetty, III | |
| 2007/0295530 A1 | 12/2007 | Jackson et al. | |
| 2008/0050611 A1 | 2/2008 | Kwok et al. | |
| 2008/0173550 A1 * | 7/2008 | Kiso | C23C 18/54 |
| | | | 205/253 |
| 2011/0091351 A1 * | 4/2011 | Long | B32B 15/01 |
| | | | 420/557 |
| 2012/0208044 A1 | 8/2012 | Dewaki et al. | |
| 2013/0236742 A1 | 9/2013 | Weitershaus et al. | |
| 2015/0196978 A1 * | 7/2015 | Iseki | C22C 13/02 |
| | | | 174/260 |

FOREIGN PATENT DOCUMENTS

| | | |
|---|---|---|
| JP | 2004359996 A | 12/2004 |
| JP | 2009052130 A | 3/2009 |

OTHER PUBLICATIONS

Boeing Invention Disclosure, Tin Antimony Platings for Whisker Mitigation, Apr. 7, 2011, 13 pages.
Britton, "Spontaneous Growth of Whiskers on Tin Coatings: 20 Years of Observation," Transactions of the Institute of Metal Finishing, vol. 52, 1974, pp. 95-102.
Brusse et al., "Tin Whiskers: Attributes and Mitigation," 22nd Capacitor and Resistor Technology Symposium Proceedings, Mar. 25-29, 2002, pp. 67-80.
Cunningham et al., "Tin Whiskers: Mechanism of Growth and Prevention," 4th International SAMPE Electronics Conference Proceedings, Jun. 12-14, 1990, p. 569-575.
Dunn, "Whisker Formation on Electronic Materials," Circuit World, vol. 2 No. 4, Jul. 1976, pp. 32-40.
Endicott et al., "A Proposed Mechanism for Metallic Whisker Growth," Proceedings of the AESF SUR/FIN Conference, Jul. 1984, pp. 1-20.
Endo et al., "Elimination of Whisker Growth on Tin Plated Electrodes," Proceedings of the 23rd International Symposium for Testing and Failure Analysis, Oct. 27-31, 1997, pp. 305-311.
Fink et al., "Electrodeposition and Electrowinning of Germanium," Journal of The Electrochemical Society, vol. 95, No. 2, Feb. 1949, pp. 80-97.
Fujiwara et al., "Interfacial Reaction in Bimetallic Sn/Cu Thin Films," Thin Solid Films, vol. 70, 1980, pp. 153-161.
Furuta et al., "Growth Mechanism of Proper Tin-Whisker," Journal of Applied Physics, vol. 8, No. 12, Dec. 1969, pp. 1404-1410.
Galyon, "Annotated Tin Whisker Bibliography," NEMI, Feb. 2003, pp. 1-21.
Galyon, "Annotated Tin Whisker Bibliography and Anthology" 2005.
Glazunova et al., "An Investigation of the Conditions of Spontaneous Growth of Filiform Crystals on Electrolytic Coatings," J. of Applied Chemistry of the USSR (translated from Zhurnal Prikladnoi Khimii), vol. 36, No. 3, Mar. 1963, pp. 519-525.
Harris, "The Growth of Tin Whiskers," ITRI Booklet No. 734, 1994, pp. 1-19.
Kakeshita et al., "Grain Size Effect of Electro-Plated Tin Coatings on Whisker Growth," Journal of Materials Science, vol. 17, 1982, pp. 2560-2566.
Kawanaka et al., "Influence of Impurities on the Growth of Tin Whiskers," Japanese Journal of Applied Physics, Part I, vol. 22, No. 6, Jun. 1983, pp. 917-922.
Key, "Surface Morphology of Whisker Crystals of Tin, Zinc and Cadmium," IEEE 20th Electronic Components Conference Proceedings, May 1970, pp. 155-160.
Lee et al., "Spontaneous Growth Mechanism of Tin Whiskers," Acta Metallurgica, vol. 46, No. 10, Jun. 1998, pp. 3701-3714.
Lindborg, "A Model for the Spontaneous Growth of Zn, Cd, and Sn Whiskers," Acta Metallurgica, vol. 24, No. 2, Feb. 1976, pp. 181-186.
Mattock, "The Complex-Forming Behaviour of Tin, Germanium, and Titanium with Some Dibasic Acids," Journal of the Chemical Society, 1954, pp. 989-997.
Mcdowell, "Tin Whiskers: A Case Study," Aerospace App. Cont., 1993, pp. 207-215.
Sabbagh et al., "Tin Whiskers: Causes and Remedies," Metal Finishing, Mar. 1975, pp. 27-31.
Sampson, "Whisker Failures," NASA Tin Whisker Homepage, NASA, Aug. 3, 2009, Web, Feb. 9, 2013, <http://nepp.nasa.gov/WHISKER/failures/index.htm>, 4 pages.
Selcuker et al., "Microstructural Characterization of Electrodeposited Tin Layer in Relation to Whisker Growth," Capacitor and Resistor Technology Symposium Proceedings, Oct. 1990, pp. 19-22.
Woodrow et al., "Tin Whisker Mitigation Study: Phase I. Evaluation of Environments for Growing Tin Whiskers," Electronic Material and Processes (EM/P) Report-576, Project I 0: CBTP-05 1-010-5 132, The Boeing Company, Aug. 1, 2003, 140 pages.
Zakraysek, et.al., "Whisker Growth from a Bright Acid Tin Electrodeposit," Plating and Surface Finishing, vol. 64, No. 3, Mar. 1977, pp. 38-43.
Zhang et al., "Phase Formation in Gold-Tin Alloys Electroplated from a Non-cyanide Bath," 2003 International Conference on Compound Semiconductor Manufacturing, 2003, 4 pages.
International Preliminary Report on Patentability for PCT/US2014/035815, dated Jan. 5, 2016, 6 pages.
Chinese Office Action dated May 16, 2017 in CN Application No. 201480037944.4, 14 pages.
Japanese Office Action dated May 15, 2018 in JP Application No. 2016-523733, 10 pages.
Office Action dated Jul. 2, 2018 from corresponding Chinese Application No. 201480037944.4.
Final Office Action dated Aug. 28, 2018 from corresponding Japanese Application No. 2016-523733, "Notice of Reasons for Rejection".
European Office Action dated Dec. 18, 2019 in corresponding European Patent Application No. 14726494.9, 4 pages.

* cited by examiner

METHODS AND APPARATUSES FOR MITIGATING TIN WHISKER GROWTH ON TIN AND TIN-PLATED SURFACES BY DOPING TIN WITH GERMANIUM

CROSS REFERENCE TO RELATED APPLICATIONS

This application is a continuation of U.S. patent application Ser. No. 13/935,768 filed Jul. 5, 2013, and issued as U.S. Pat. No. 10,633,754, which is hereby incorporated by reference in its entirety.

STATEMENT OF GOVERNMENT RIGHTS

This invention was made with U.S. Government support under Contract Number W912HQ-10-C-0022 awarded by the U.S. Department of Defense. The U.S. Government has certain rights in this invention.

TECHNOLOGICAL FIELD

The present disclosure generally relates to the field of tin electroplating. More specifically, the present disclosure relates to methods for mitigating tin whisker formation on tin-plated films and tin-plated surfaces by doping the tin with germanium.

BACKGROUND

The worldwide transition to lead-free electronics is forcing most major suppliers of electronic components to convert their product lines from tin/lead-containing finishes to lead-free finishes. As a result, most electronics suppliers have moved to pure electroplated tin finishes. However, there is a tendency of electroplated pure tin finishes to form tin whiskers that extend a distance from the surface. Such tin whiskers have been found to form on a wide variety of tin-plated components, and under a wide range of environmental conditions. Since these tin whiskers are comprised of nearly pure tin and are therefore electrically conductive, they can cause problems, such as, for example, shorting of electronic components. Therefore the growth of tin whiskers from tin-plated surfaces continues to cause reliability and other problems for electronic systems that use components that are plated with tin. Undesirable effects on electronics attributable to tin whisker formation on tin-plated surfaces have caused significant customer dissatisfaction resulting in significant financial impact on the manufacturers of electronics. To date, the only way to ensure that tin whiskers do not grow within an electronic system is to eliminate pure tin from such a system. However, the increasing reliance on the use of tin and tin-plated components in the electronic industry makes this tin elimination strategy unworkable. One tin whisker mitigation strategy has been to immerse all tin-plated component leads into molten tin/lead, from the tip of the lead up to the component body. However, this process can undesirably affect the component and is expensive to implement into the manufacturing process.

BRIEF SUMMARY

According to one variation, the present disclosure relates to a method for mitigating tin whisker growth on a substrate surface. A germanium-containing compound is dissolved to make a germanium-containing solution. Water and a complexing agent are then added to the germanium-containing solution. A water-soluble tin-containing compound is then added to the germanium-containing solution. An optional surfactant/leveling agent may be added before or after the tin-containing compound is added to the germanium-containing solution. Electrodes are immersed into the solution with the electrodes connected to an electrical power source capable of providing an electrical current. The power source is activated to provide the electrical current to the solution resulting in an amount of germanium and tin co-deposited onto the cathodic substrate surface. According to one variation, the cathodic substrate surface comprises copper, a commonly used material for electronic components such as, for example, leads. Preferably, the germanium and tin are co-deposited onto the substrate surface to a thickness from about 1 to about 10 microns, with an amount of from about 0.5 to about 5 weight percent by weight germanium and 99.5 to about 95% be weight tin co-deposited on the substrate surface.

According to further variations, the germanium-containing compound is selected from the group including germanium dioxide, or other germanium-containing compound that can be solubilized into aqueous solutions, preferably alkaline solutions. Preferably, germanium dioxide is dissolved in a sodium hydroxide solution. According to a still further variation, the germanium-containing compound is provided to the solution directly as a salt, such as germanium fluoroborate, or other water-soluble germanium salt, and combinations thereof. It is understood that the tin-containing compound is added to the solution as a water-soluble salt, preferably tin (II) sulfate.

The present disclosure further relates to a method for mitigating tin whisker growth on a substrate surface comprising the steps of, dissolving an amount of a germanium-containing compound in a basic solution, (preferably germanium dioxide dissolved in a sodium hydroxide solution), adding an amount of water, preferably deionized water, to the germanium-containing compound in solution, adding a complexing agent (preferably d,l-tartaric acid), optionally adding a surfactant/leveling agent, and dissolving an amount of tin-containing compound (preferably tin (II) sulfate) into the germanium-containing solution. A tin-containing anodic electrode is immersed into the germanium-containing and tin-containing solution and a cathodic substrate surface is immersed into the germanium-containing and tin-containing solution. An electrical power source is provided to the anodic electrode and the cathodic substrate (acting as an electrode) comprising a cathodic substrate surface, and then activated to provide an electrical current to the electrodes, resulting in co-depositing an amount of germanium and tin onto the substrate surface. The systems, methods and apparatuses of the present disclosure could also be used and incorporated into systems and methods using a three electrode system with the third electrode being used as a reference electrode.

In a further variation, the present disclosure relates to a method for making an electroplating bath comprising the steps of dissolving an amount of a germanium-containing compound in a basic solution (preferably germanium dioxide in an amount of sodium hydroxide solution), adding an amount of water (preferably deionized water) to the germanium-containing solution, adding an amount complexing agent (preferably d,l-tartaric acid) to the germanium-containing solution, optionally adding a surfactant/leveling agent, and dissolving an amount of water-soluble tin-containing compound (preferably tin (II) sulfate) into the germanium-containing solution. In addition, the present disclosure contemplates an electroplating bath made according to the above method.

In a still further variation, the present disclosure relates to an electroplating bath comprising an amount of a germanium-containing compound in an aqueous solution (preferably germanium dioxide in an amount of sodium hydroxide solution), an amount of water added to the solution, an amount of complexing agent (preferably d,l-tartaric acid), an amount of optional surfactant/leveling agent, and an amount of tin-containing compound (preferably tin (II) sulfate).

Still further, the present disclosure relates to a coating for mitigating tin whisker growth by co-depositing an amount of a germanium and tin onto a substrate surface. According to a preferred variation, the germanium and tin are electrodeposited onto a substrate surface, preferably to a thickness of from about 1 micron to about 10 microns. Preferably, the substrate surface comprises copper, and the germanium is preferably co-deposited with the tin onto the substrate at a concentration of from about 0.5 to about 5 weight percent germanium, and more preferably, from about 1 to about 2 weight percent germanium.

The present disclosure contemplates the described coatings as usefully coating any object, including, but in no way limited to, electronic components where it is desirable to mitigate the formation of tin whiskers by replacing a pure tin-containing surface with a tin and germanium plating.

BRIEF DESCRIPTION OF THE DRAWINGS

Figure 1A:
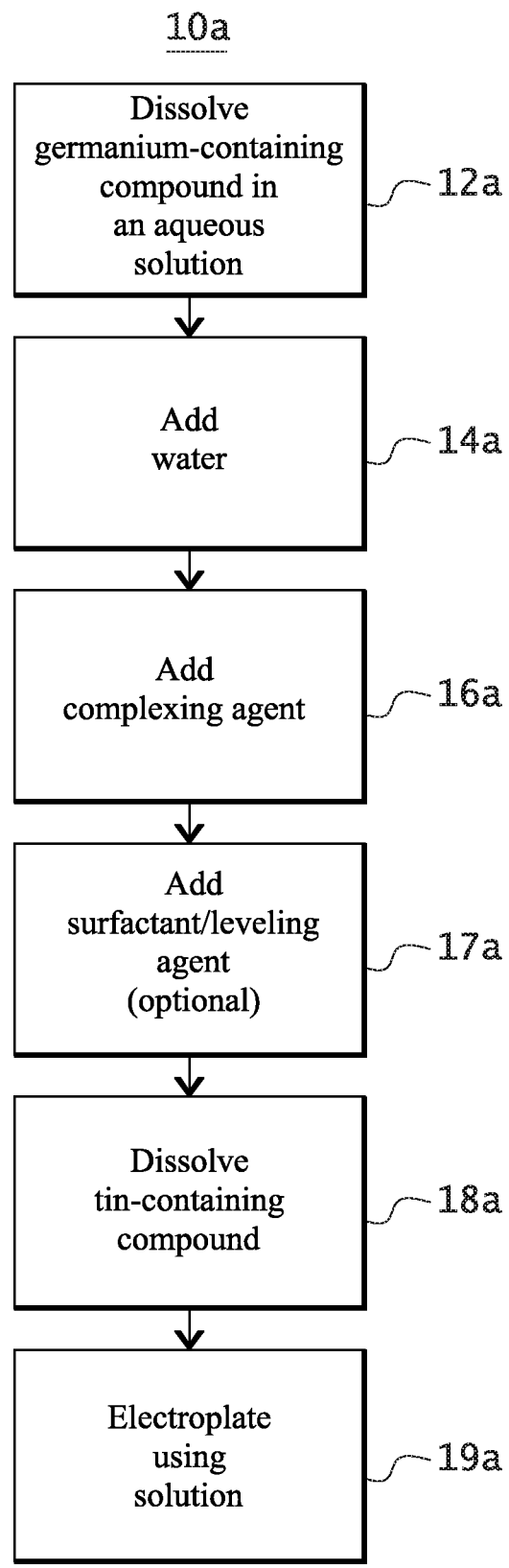
Figure 1B:
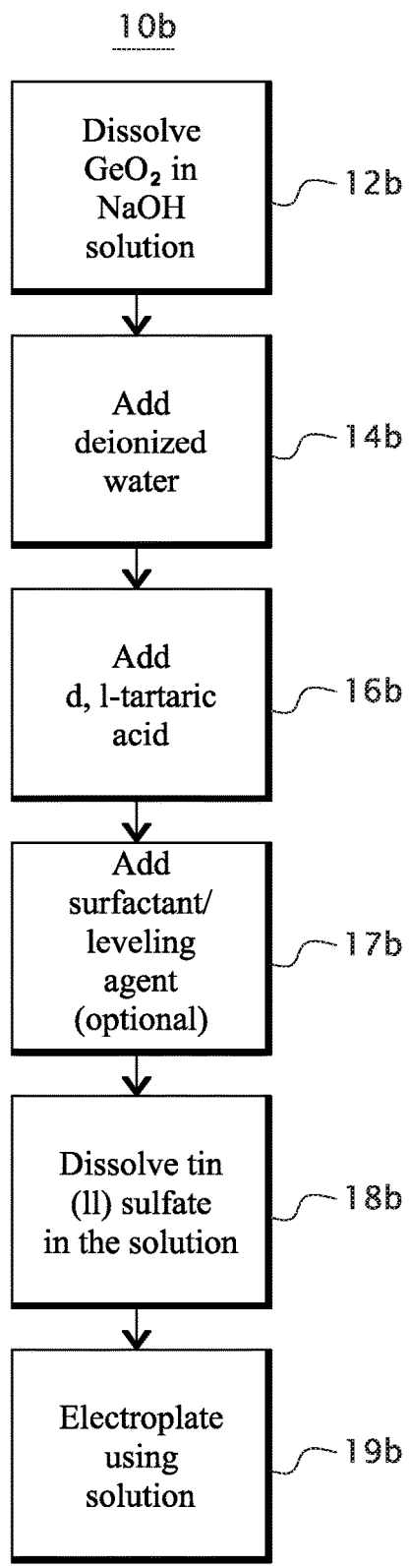
Figure 2:
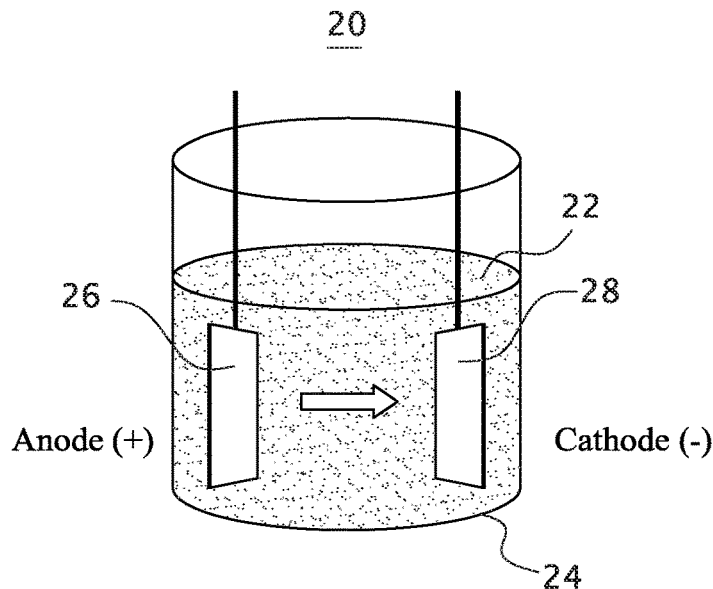
Figure 3:
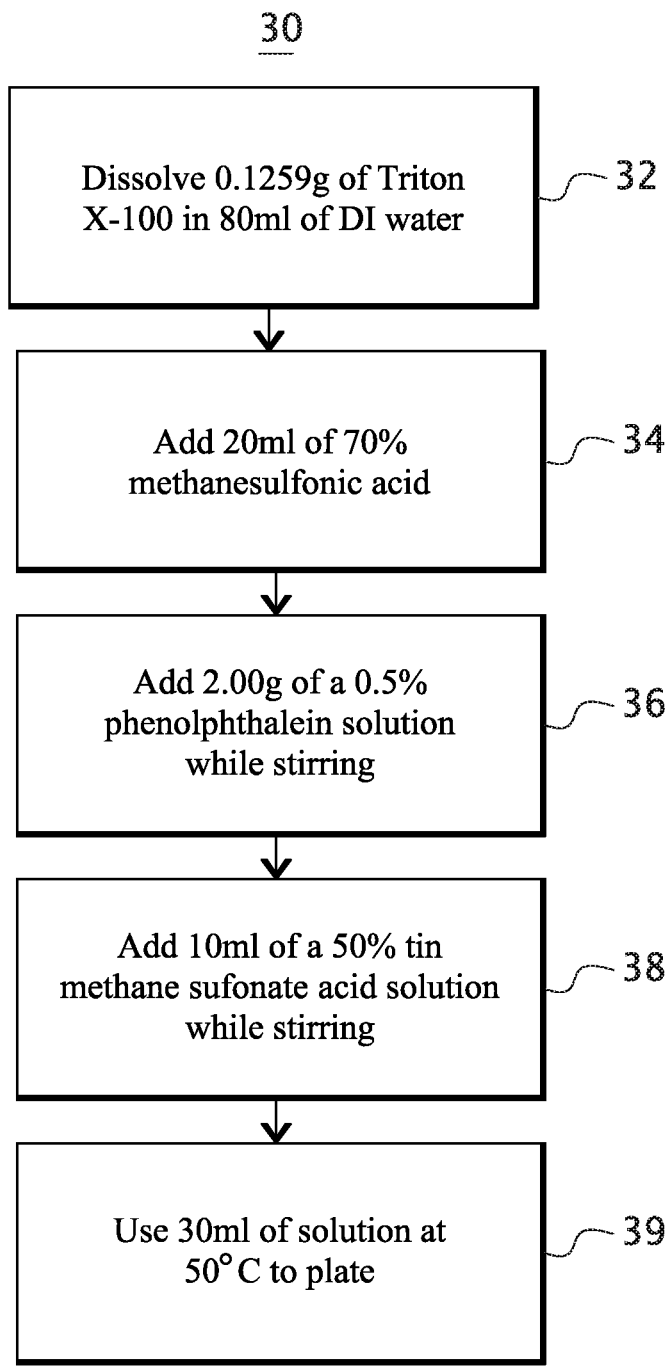
Figure 4:
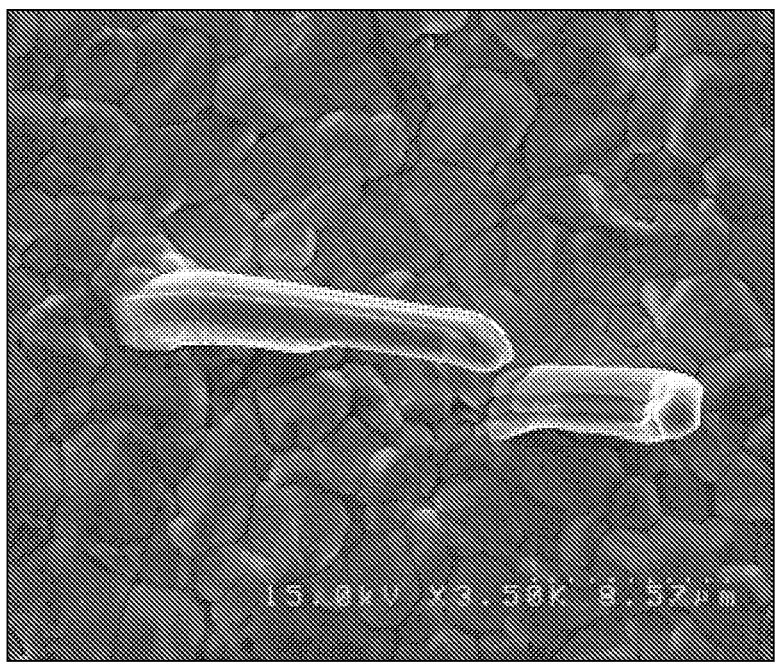
Figure 5:
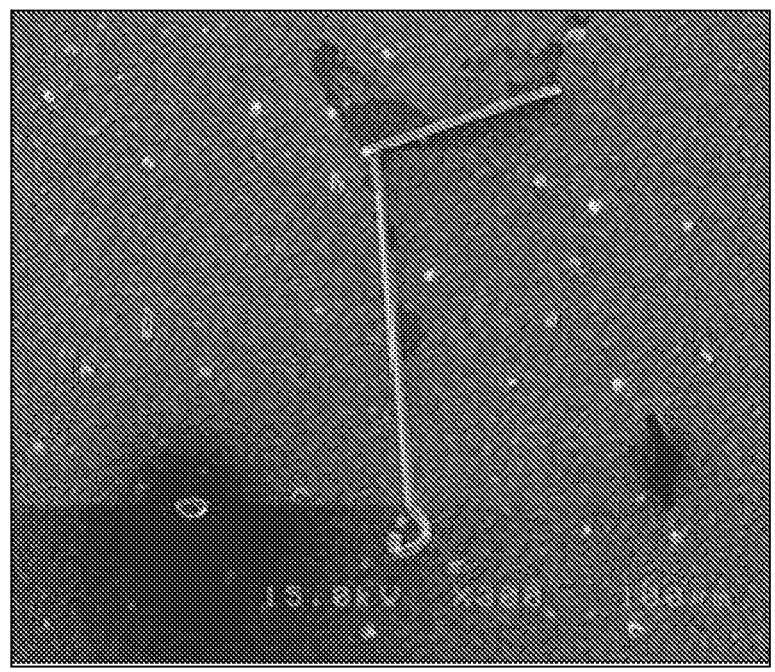
Figure 6:
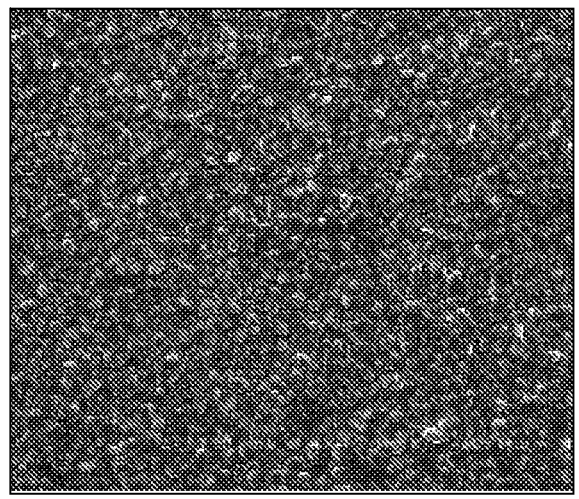
Figure 7:
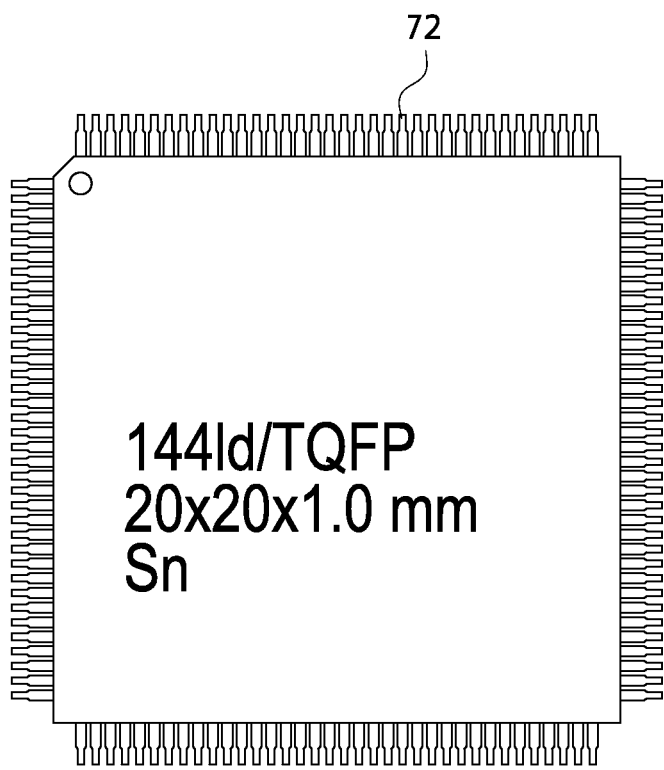
Figure 8:
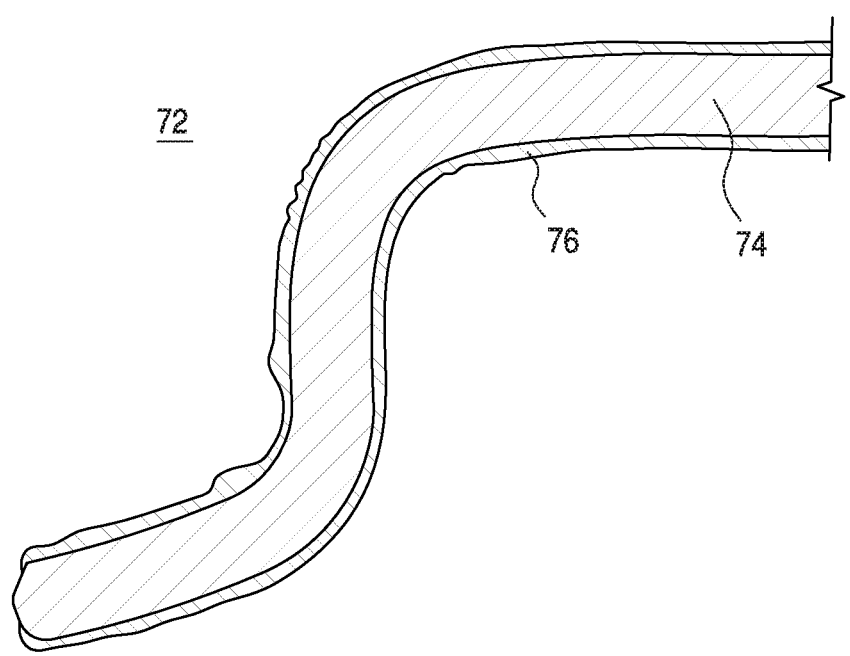

Having thus described variations of the disclosure in general terms, reference will now be made to the accompanying drawings, which are not necessarily drawn to scale, and wherein:

FIGS. 1a and 1b are flowcharts for processes of plating a coating comprising germanium and tin onto a substrate surface;

FIG. 2 is a schematic representation of an electroplating bath for plating a germanium and tin coating onto a substrate surface;

FIG. 3 is a flowchart for a process of plating a coating comprising pure tin onto a substrate surface;

FIGS. 4 and 5 are micro-photographs of tin whiskers growing from a pure tin-plated substrate surface;

FIG. 6 is a micro-photograph of a surface coated with a plating comprising germanium and tin;

FIG. 7 is a schematic representation of an electronic component with leads oriented along the perimeter of the component body; and FIG. 8 is a further enlarged schematic representation of the leads shown in FIG. 7.

DETAILED DESCRIPTION

The present disclosure relates to the development of electroplated tin films that are doped with germanium to suppress the growth of tin whiskers from the plated substrate surface, as otherwise commonly occurs with tin-plated substrates. The addition to tin of amounts of germanium of from about 0.5 to about 5 weight percent germanium has now been shown to significantly suppress undesired tin whisker growth.

FIG. 1a shows a flow chart for one preferred electroplating method variation 10a. An amount of germanium-containing compound was dissolved in an aqueous solution 12a. An amount of water was added 14a to the germanium-containing solution. An amount of complexing agent was added 16a to the germanium solution. Optionally, an amount of surfactant/leveling agent 17a was added to the germanium solution. An amount of water-soluble tin-containing compound was dissolved into solution and added to the germanium solution 18a. The tin and germanium solution was then used to electroplate a substrate surface 19a.

FIG. 1b shows a flow chart for one preferred electroplating method variation 10b. An amount of germanium-dioxide was dissolved in a sodium hydroxide solution 12b. An amount of deionized water was added 14b to the germanium-containing solution. An amount of d,l-tartaric acid was added 16b to the germanium solution. Optionally, an amount of surfactant/leveling agent 17b was added to the germanium solution. An amount of tin (II) sulfate was added to the germanium solution 18b. The tin and germanium solution was then used to electroplate a substrate surface 19b.

As shown in FIG. 2, an electroplating bath 20 comprises container 24 comprising a germanium- and tin-containing electrolyte solution 22 into which is suspended an anode 26 (e.g. a pure tin anode, a tin and germanium anode, etc.) and a cathode 28 (e.g. a copper or other metallic cathode, etc.).

Example 1

$GeO_2$ (99.98%, Aldrich) in an amount of 0.1479 g was dissolved in 2.086 g of 1 N NaOH solution (Integra Chemical). The solids were ground with a Teflon rod until the solids dissolved. An amount of 6 ml of deionized water was added to the solution and stirred until a substantially clear and colorless solution was achieved. An amount of 0.3919 g of d,l-tartaric acid (99%, Alfa Aesar) was dissolved into the solution with stirring to obtain a substantially clear and colorless solution. The solution was then tested and found to have a pH of 2.28. A surfactant/leveling agent, Triton X-100 (Dow Chemical), in an amount of 0.0618 g in 20 ml of deionized water was added with stirring. Tin (II) sulfate (99.6%, Alfa Aesar) in an amount of 0.340 g was dissolved in the electrolyte solution to obtain a translucent, colorless solution. The electrolyte solution was then used to electroplate substrate surfaces. According to the present disclosure, germanium is co-deposited with tin onto a substrate surface in the electroplating solution in a preferred amount of from about 0.5 to about 5 weight percent germanium, more preferably, from about 1 to about 2 weight percent germanium.

Plating was conducted using 30 ml of the $GeO_2$/Sn electrolyte solution described immediately above at 18° C. in a 50 ml beaker with stirring. (See FIG. 2, stirring not shown). The anode was constructed from tin sheet (99.998%, Aldrich) and had a surface area of approximately 2 $cm^2$. Two coupons were plated at a time. The two coupons were used as the cathode by connecting both of them together using an alligator clip. The two coupons had a total surface area of 2 $cm^2$. Plating was conducted at 0.995 volts and 14 milliamps for 8 minutes to yield a light gray matte plated film on the coupons. The tin anode was cleaned using 500 grit SiC paper before each set of samples was plated.

The first and seventh germanium-doped tin films were analyzed by inductively coupled plasma (ICP) spectroscopy. The ICP results are shown in Table 1, along with other properties of the tin and germanium platings and pure tin control platings.

TABLE 1

| Plated Film | ICP Analysis (First Coupon) | ICP Analysis (Last Coupon) | Plating Thickness (microns) | Roughness as Plated (Ra) (nm) | Roughness as Plated (TIR) (nm) | Average Grain Size (microns) | Grain Morphology |
|---|---|---|---|---|---|---|---|
| Sn | | | 4.9 | 105 | 725 | 2.88 | Columnar |
| SnGe | 1.0% Ge | 1.1% Ge | 2.3-3.8 | 117 | 715 | 2.33 | Columnar |

Typically, the tin and germanium plated films were completely dissolved off the coupons using a mixture of 8 ml of 1:1 nitric acid and 4 mls of concentrated hydrochloric acid in a small beaker. This solution was then transferred to a 100 ml volumetric flask, diluted to volume with deionized water, and analyzed to confirm the presence of the elements of interest (Ge and Sn) in the plating by using an ICP spectrometer. The surface roughness of the plating was measured using a KLA-Tencor Alpha-Step 200 profilometer. The average surface roughness (Ra) and the maximum trough to peak roughness (TIR) were also measured (see Table 1).

FIG. 3 is a flowchart showing the method 30 for electroplating the pure tin-coated samples for use as comparative control samples. This was achieved using the method developed by Yun Zhang (described in U.S. Pat. No. 5,750,017). Triton X-100 (Dow Chemical) in an amount of 0.1259 g was dissolved in 80 ml of deionized water 32. Methanesulfonic acid (70%) (Aldrich) in an amount of 20 ml was added 34. Phenolphthalein solution (0.5%) (Aldrich) in an amount of 2.00 g was added drop wise while stirring 36. Tin methanesulfonate solution (50%) (Aldrich) in an amount of 10 ml was added to the solution while stirring 38. Plating was conducted using 30 ml of the above electrolyte solution held at 50° C. in a 50 ml glass beaker while stirring 39. The anode was constructed from 99.998% tin sheet (Aldrich). Plating was performed at 0.045 V and 10.9 milliamps for 8 minutes to yield a gray satin plating.

Immediately after plating, the test specimens were put into a 50° C./50% relative humidity chamber in an effort to accelerate tin whisker formation and growth. Specimens plated with pure tin were also put into the test chamber for use as a control. At approximately 6 months, 12 months and 18 months, the test specimens were examined using a scanning electron microscope (SEM). The pure tin plated films had numerous nodules and whiskers growing from the surface. See FIG. 4 (3500× magnification after 12,000 hours of aging) and FIG. 5 (300× magnification after 12,000 hours of aging). In contrast, the germanium-doped tin plated films had zero whiskers develop across the 1 mm² area evaluated over the same 6 month, 12 month and 18 month evaluation periods. See FIG. 6 (1000× magnification after 12,000 hours of aging).

As shown in the Example above, various surfactants may be added to the electrolyte solution containing the germanium and tin. Preferred surfactants are non-ionic surfactants that act as leveling agents to help obtain a substantially uniform coating when plating onto a substrate. Preferred surfactants include Triton X-100, Igepal CA-630, Nonidet P-40, Conco NI, Dowfax 9N, Igepal CO, Makon, Neutronyx 600 series, Nonipol NO, Plytergent B, Renex 600 series, Solar NO, Sterox, Serfonic N, T-DET-N, Tergitol NP, Triton N, etc., with Triton X-100 being particularly preferred.

Without being bound to a particular theory, it is believed that the d,l-tartaric acid serves to complex the germanium ions and probably the tin ions in solution. In theory, two metals with different electromotive potentials cannot be practically plated at the same time. This limitation is usually overcome by chemically complexing one or both metals, which effectively brings their electromotive potentials closer together and allows them both to be plated/deposited at the same time. Other complexing agents that may work for the tin and germanium system include without limitation, citric acid, succinic acid, aspartic acid, EDTA, mannitol, or any organic compound with carboxylic acid groups, or other groups capable of complexing metal ions in solution, etc.

The germanium-doped tin coatings affected through the processes set forth in this disclosure are understood to be deposited onto a substrate of choice to a preferred thickness of from about 1 to about 50 microns, and more preferably to a thickness of from about 1 to about 10 microns, with a preferred germanium concentration of from about 0.5 to about 5% by weight, and more preferably from about 1 to about 2 weight percent. It is understood that the germanium may be present in concentrations in excess of 5%. However, the tin whisker mitigation observed during 18 months of observation was achieved with germanium concentrations of only about 1%. It is believed that excessive germanium concentrations could impact the economic feasibility of the disclosed methods and coatings, perhaps without offering enhanced performance relative to tin whisker mitigation. In addition, the germanium concentration must not interfere with the physical and chemical performance of the tin relative to, for example, soldering of the coated component, etc.

FIG. 7 shows an enlarged schematic view of a representative electronic component having tin-plated leads. As shown, component 70 has tin-plated copper leads 72 about the periphery and extending from the body of component 70. FIG. 8 is a further enlargement of a cross-sectional view of a tin-plated copper lead 72 showing the copper 74 coated by a tin electroplate 76. It is understood that the electroplated coatings of the present disclosure will find utility relative to any and all electronic components and parts comprising copper or other metals where a tin coating would be required to make parts solderable, for example.

The examples presented herein contemplate use of the tin and germanium platings on objects including electronic components such as, for example, quad flat packs, plastic dual in-line packages (PDIPs), small-outline integrated circuits (SOICs), relays, etc., or as a plating for traces on printed circuit boards, etc. It is further contemplated that such electronic parts plated with the tin and germanium coatings of the present disclosure will find utility in any electronics systems used, for example, in any aircraft, spacecraft, terrestrial or non-terrestrial vehicles, as well as stationary structures and objects. A non-exhaustive list of contemplated vehicles include manned and unmanned aircraft, spacecraft, satellites, terrestrial, non-terrestrial and surface and sub-surface water-borne vehicles, etc.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. An electroplating bath comprising:
   an amount of a germanium-containing compound in an aqueous solution;
   an amount of water;
   an amount of a complexing agent; and
   an amount of a water-soluble tin-containing compound,
   wherein the amount of germanium-containing compound and the amount of the water-soluble tin-containing compound is sufficient to form a uniform and co-deposited electroplated coating comprising about 1 to about 2 weight percent germanium and about 95 to about 99.5 weight percent tin, and
   wherein the electroplated coating is co-deposited onto a substrate surface to an as plated thickness of from about 1 to about 50 microns and wherein the electroplated coating comprises an as plated average surface roughness (Ra) of about 117 nm and an as plated average grain size of about 2.33 microns.

2. The electroplating bath of claim 1, wherein the germanium-containing compound is germanium dioxide ($GeO_2$) solubilized in a basic solution.

3. The electroplating bath of claim 1, wherein the complexing agent is d,l-tartaric acid.

4. The electroplating bath of claim 1, further comprising an amount of surfactant/leveling agent.

5. The electroplating bath of claim 1, wherein the water soluble tin-containing compound is tin (II) sulfate.

6. The electroplating bath of claim 2, wherein the amount of the germanium-containing compound is 0.1479 g of germanium dioxide.

7. The electroplating bath of claim 5, wherein the amount water-soluble tin-containing compound comprises 0.340 g of tin (II) sulfate.

8. The electroplating bath of claim 3, wherein the amount of the complexing agent is 0.3919 g of d,l-tartaric acid.

9. The electroplating bath of claim 1, wherein the complexing agent is one of citric acid, succinic acid, aspartic acid, EDTA, mannitol, or an organic compound with carboxylic acid groups.

10. The electroplating bath of claim 1, wherein the aqueous solution comprises a sodium hydroxide solution.

11. The electroplating bath of claim 1, wherein a temperature of the electroplating bath is 18° C.

12. The electroplating bath of claim 1, wherein a pH of the electroplating bath is 2.28.

13. The electroplating bath of claim 4, wherein the surfactant comprises 0.0618 g of the surfactant in 20 ml of deionized water.

14. An electroplated coating for mitigating tin whisker growth on a substrate surface comprising:
   a co-deposited amount of from about 1 to about 2 weight percent germanium and an amount of from about 95 to about 99.5 weight percent tin, wherein the germanium and tin comprise a uniform coating on the substrate and are co-deposited onto the substrate surface to an as plated thickness of from about 1 to about 50 microns and wherein the electroplated coating comprises an as plated average surface roughness (Ra) of about 117 nm and an as plated average grain size of about 2.33 microns.

15. The electroplated coating of claim 14, wherein the germanium and tin are co-deposited onto the substrate surface to an as plated thickness of from about 1 to about 10 microns.

16. The electroplated coating of claim 14, wherein the electroplated coating comprises no whisker growth after 6 months of exposure to a temperature of at least a 50° C. and a relative humidity of at least 50%.

17. The electroplated coating of claim 14, wherein the electroplated coating comprises no whisker growth after 12 months of exposure to a temperature of at least a 50° C. and a relative humidity of at least 50%.

18. The electroplated coating of claim 14, wherein the substrate comprises copper.

19. The electroplated coating of claim 14, wherein the electroplated coating comprises 1.1 weight percent germanium.

20. The electroplated coating of claim 15, wherein the germanium and tin are co-deposited onto the substrate surface to an as plated thickness of from about 2 to about 4 microns.

* * * * *